(12) United States Patent
Zhang et al.

(10) Patent No.: US 8,588,624 B2
(45) Date of Patent: Nov. 19, 2013

(54) PILOT SYMBOL AIDED CARRIER PHASE ESTIMATION

(75) Inventors: Hongbin Zhang, Marlboro, NJ (US); Dmitri Foursa, Colts Neck, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 473 days.

(21) Appl. No.: 12/775,770

(22) Filed: May 7, 2010

(65) Prior Publication Data

US 2011/0274442 A1    Nov. 10, 2011

(51) Int. Cl.
    *H04B 10/66*    (2013.01)
(52) U.S. Cl.
    USPC ........................................................ 398/208
(58) Field of Classification Search
    USPC .......................................... 398/154, 203, 208
    See application file for complete search history.

(56) References Cited

U.S. PATENT DOCUMENTS

| | | | |
|---|---|---|---|
| 5,978,123 A * | 11/1999 | Czichy et al. | 398/188 |
| 6,072,841 A | 6/2000 | Rahnema | |
| 7,123,670 B2 | 10/2006 | Gilbert et al. | |
| 7,215,725 B2 | 5/2007 | Yousef et al. | |
| 7,715,472 B2 * | 5/2010 | Yu et al. | 375/232 |
| 2003/0058499 A1 | 3/2003 | Reingand et al. | |
| 2005/0196176 A1 * | 9/2005 | Sun et al. | 398/152 |
| 2007/0025738 A1 | 2/2007 | Moore | |
| 2008/0025249 A1 * | 1/2008 | Kuppuswamy et al. | 370/325 |
| 2008/0056305 A1 | 3/2008 | Medvedev et al. | |
| 2011/0305462 A1 * | 12/2011 | Buelow | 398/158 |

FOREIGN PATENT DOCUMENTS

EP    2109272 A1    10/2009

OTHER PUBLICATIONS

B. Wandernoth, "1064 nm, 565 Mbit/s PSK transmission experiment with homodyne receiver using synchronization bits", Electronics Letters, Sep. 12, 1991.*

Written Opinion of the International Searching Authority for corresponding application No. PCT/US2011/035623.

* cited by examiner

*Primary Examiner* — Shi K Li

(57) ABSTRACT

Methods and systems for processing an optical signal in a communication system are disclosed. The disclosed methods yield benefits for estimation and tracking of carrier phase of received signals at a digital coherent receiver. Specifically, phase ambiguity is removed by the insertion of pilot symbols into a transmitted data stream. Pilot symbols are detected from a received signal, and carrier phase is estimated for the detected pilot symbols. If carrier phase track of received data symbols was lost, a correction is applied to recover the track. Coherent symbol decoding may be used which has not been possible with prior art techniques due to the possibility of phase tracking loss.

15 Claims, 7 Drawing Sheets

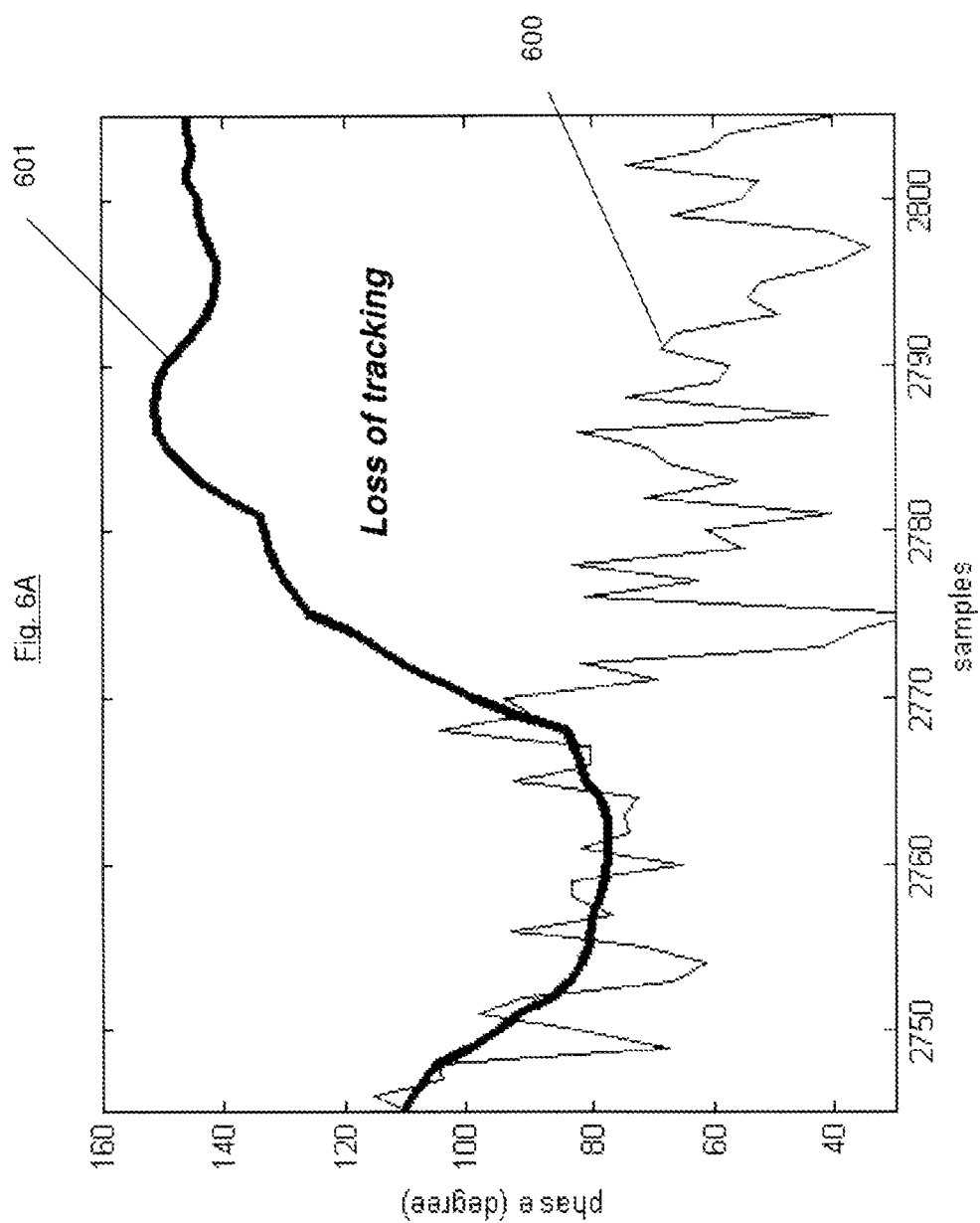

PILOT SYMBOL AIDED CARRIER PHASE ESTIMATION

FIELD OF THE INVENTION

Embodiments of the present disclosure relate to the field of optical communication systems. More particularly, the present disclosure relates to the addition of pilot symbols in modulated optical signals to aid in joint polarization phase estimation in coherent optical receivers.

DISCUSSION OF RELATED ART

In optical communication systems, various modulation schemes are used to transmit optical signals using dense wavelength division multiplexing (DWDM) where a plurality of optical channels each at a particular wavelength propagate over fiber optic cables. However, various non-linearities including, for example, self-phase modulation (SPM) and cross-phase modulation (CPM) may induce nonlinear phase shifts which effect signal reception and decoding of these transmitted signals. After propagation over long distances, the impact of these non-linearities create processing and decoding difficulties at the receiver which may compromise the integrity of the transmitted information.

Coherent decoding detects not only an optical signal's amplitude but phase and polarization as well. In other words, it detects whole characteristics of the received signal across the spectrum. This allows the receiver to compensate for the linear channel transfer function. Moreover, quadrature phase Shift Keying (QPSK) and polarization division multiplexing (PDM) schemes can be implemented and thus increase detection capability and spectral efficiency.

In coherent phase modulated optical communication systems, the carrier phase of the transmitter must be estimated and tracked at the receiver in order to decode the transmitted information signals. However, an inherent problem associated with coherent receivers in phase modulated optical communication systems is that of phase ambiguity associated with phase detection at the receiver. This is due to the presence of data modulation in the phase detection. When the phase error reaches $\pi/4$ for QPSK or $\pi/2$ for Binary Phase Shift Keying (BPSK), a "cycle slip" can occur in which symbols may be erroneously interpreted as lying in an adjacent quadrant. For systems utilizing these types of modulation techniques, this results in erroneous interpretation of the symbols following the cycle slip. Therefore, it is important to differentially pre-code data to avoid error propagation. However, differential pre-coding suffers from about 1 dB Q penalty at low optical signal to noise ratios because a single symbol error becomes a pair of consecutive symbol errors. Accordingly, it is an object of the present disclosure to overcome these problems and provide better system performance at a lower optical signal to noise ratio in optical communication systems.

SUMMARY OF THE INVENTION

Exemplary embodiments of the present disclosure are directed to a method for estimating the carrier phase of a modulated optical signal. In an exemplary method, an optical signal is received having data symbols and pilot symbols which have predefined data modulation. The carrier phase of the received pilot symbols are detected. The carrier phase of the data symbols is estimated by an Mth power scheme. A differential phase between the pilot symbol and the adjacent data symbol is determined. The differential phase is compared to a defined phase tolerance to determine if the cycle slip or phase error of the data symbols occurred before the pilot symbols. If cycle slip occurred, then the carrier phase of the data symbols are estimated by linear interpolation of the phase between a pair of pilot symbols.

BRIEF DESCRIPTION OF THE DRAWINGS

FIGS. 6A, 6B are graphs showing the loss of tracking without pilot symbols and pilot symbol aided joint polarization estimation in accordance with the present disclosure.

DETAILED DESCRIPTION

Figure 1:
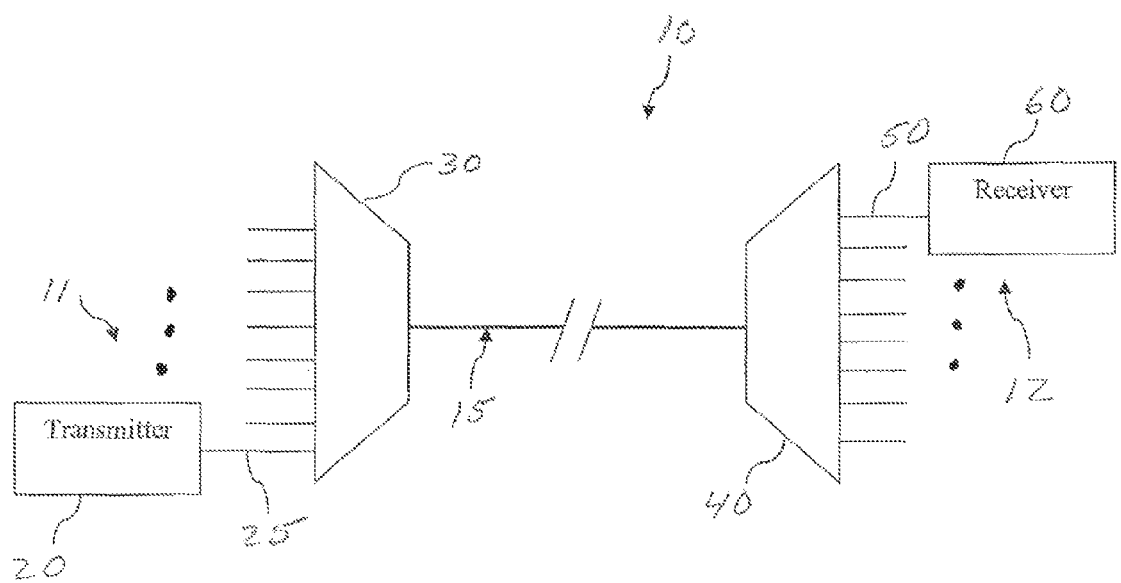
FIG. 1 is a simplified block diagram of an optical communication system in accordance with the present disclosure.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Presently disclosed embodiments mitigate the impact of nonlinear phase noise through improved carrier phase estimation with increased tracking capability. Phase ambiguity associated with carrier phase estimation may be removed by inserting one or more pilot symbols, which are reference symbols, inserted at known positions in a modulated optical signal. The one or more pilot symbols represent known data information and are inserted periodically among data symbols in the modulated signal. The carrier phase of the one or more pilot symbols is estimated by determining the differential phase between the one or more pilot symbols and the carrier phase of an adjacent or previous data symbol. By utilizing pilot symbols in the modulated signal, coherent PSK without precoding may be employed which provides better system performance at a lower optical signal to noise ratio than previously realized.

FIG. 1 generally illustrates a simplified optical communication system 10 including an exemplary transmit terminal 11, receive terminal 12 and an optical transmission medium 15 disposed therebetween. The optical transmission medium may be a fiber optic cable having a plurality of fiber pairs configured to propagate communication signals between terminals 11 and 12. Terminal 11 includes a plurality of transmitters 20 which supplies a modulated optical signal 25 having a particular one of a plurality of wavelengths to multiplexer 30. Multiplexer 30 combines the modulated optical channels from the transmitters 20 and combines them in a dense wavelength division multiplexed (DWDM) signal for propagation over fiber optic cable 15. It should be understood that the exemplary transmitter 20 may also be included in terminal 12 for bidirectional transmission. Terminal 12 includes a demultiplexer 40 used to separate the received DWDM optical signal into individual wavelengths or channels 50. Once separated, each channel is supplied to a respective receiver 60 and processed to provide a demodulated optical data signal. It should be understood that the exemplary receiver 60 may also be included in terminal end 11 for bidirectional transmission.

As described earlier, in order to transmit and receive these optical signals long distances, various modulation techniques are employed to provide a detectable optical signal at receiver 60. These modulation techniques include, for example, QPSK (quadrature phase-shift keying); DP-QPSK (dual polarization quadrature phase-shift keying), etc., in which data is identified by phases of an optical carrier. However, various known non-linear effects impact the integrity of the optical signal received by receiver 60 after propagation over cable 15. For example, the light sources used to provide the optical signal at transmitters 20 are typically external cavity lasers capable of providing linewidths in the range of 100 KHz. However, after propagation over cable 15 the received linewidth of the light may have broadened to tens of MHz due to non-linear effects such as four-wave mixing, cross-phase modulation (CPM), self-phase modulation (SPM), etc. Because of these nonlinear effects, the phase of the optical signal received at receiver 60 may have rotated such that the decoded symbols do not match those which were generated by transmitter 20. This causes symbol or data errors.

Figure 1A:
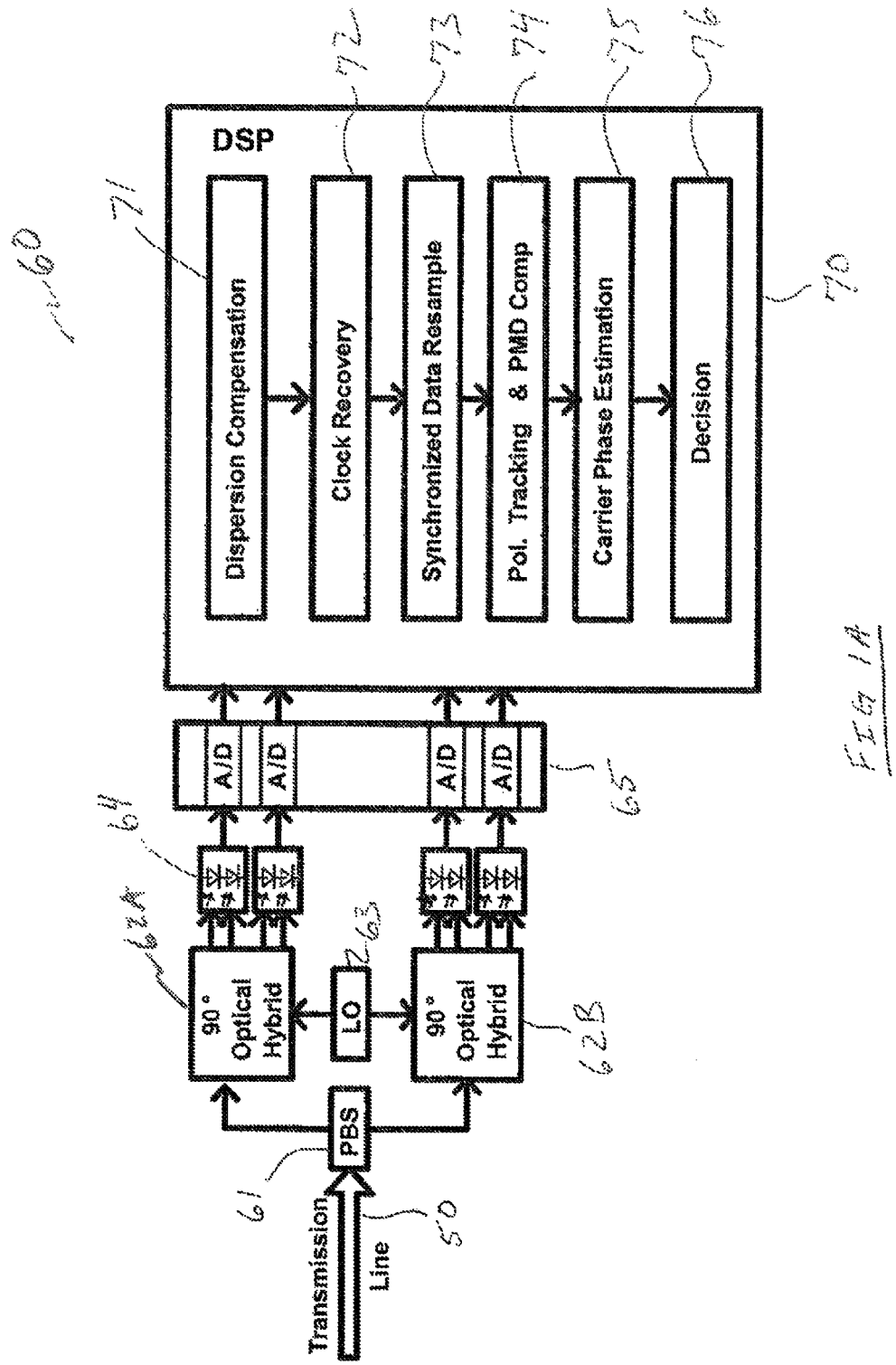
FIG. 1A is a simplified block diagram of an optical receiver of the communication system of FIG. 1 in accordance with the present disclosure.

FIG. 1A is a simplified block diagram of receiver 60 shown in FIG. 1 in accordance with the present disclosure. The transmitted DWDM channels 50 are received and supplied to a polarization beam splitter (PBS) 61. The polarization split signal is provided to a pair of 90° optical hybrid interferometers 62A and 62B which extracts phase and amplitude between the received signal and local oscillator 63. A plurality of photodetectors denoted generally as 64 generate respective electrical signals proportional to the received optical signals from the hybrid interferometers 62A and 62B. A plurality of Analog to Digitial (A/D) converters 65 connected to respective photodetectors 64 receive the electrical signals and supply corresponding digital signals to digital signal processor (DSP) 70. The DSP 70 may include various modules/circuits including dispersion compensation circuit 71, clock recovery circuit 72, synchronized data resampling module 73, polarization tracking and polarization mode dispersion compensation module 74, carrier phase estimation module 75 and decision module 76. Receiver 60 is configured to decode the received modulated data symbols.

Carrier phase estimation associated with decoding QPSK modulated signals is difficult since the modulated data is present in the received optical signal. In order to decode the received signal, the modulated data must be removed from the signal to determine the carrier phase and thus, synchronize the demodulation of the data symbols based on the phase of the carrier. However, an inherent problem associated with typical coherent QPSK systems is that of phase ambiguity at the receiver. This phase ambiguity is due to the general inability of the carrier recovery circuit in an associated receiver to distinguish the reference phase from the other phase(s) of the received carrier.

Figure 2:
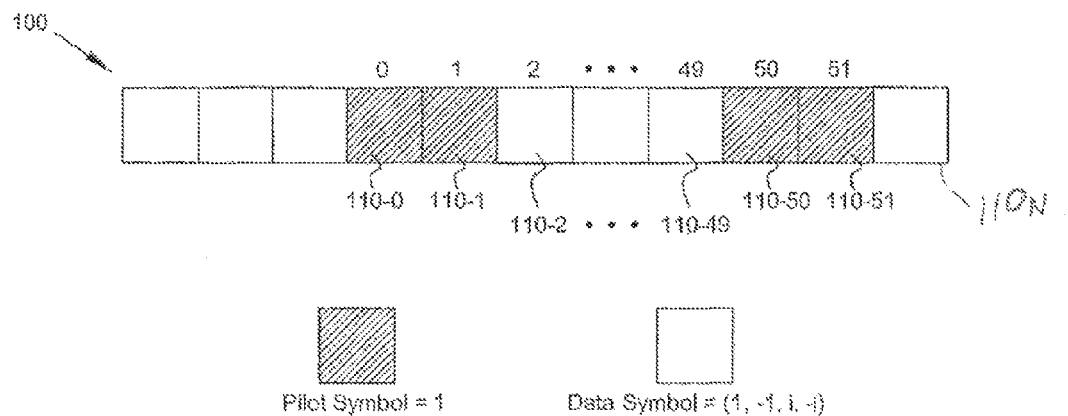
FIG. 2 is a depiction of a pilot symbol insertion scheme in accordance with the present disclosure.

In order to remove the phase ambiguity of the carrier, pilot symbols having known data information are inserted periodically within the modulated optical signal in accordance with the present disclosure. FIG. 2 illustrates an exemplary transmitted sequence of data 100 having symbols $110_N$ and a period length in a modulated optical signal 25 generated by transmitter 20 in an exemplary optical communication system 10. A first set of one or more pilot symbols 110-0, 110-1 is inserted within a data sequence 100 to be modulated on a carrier wave. A second set of one or more pilot symbols 110-50, 110-51 are inserted into the data sequence 100 after data symbols 110-2 . . . 110-49. The data symbols 110-2 . . . 110-49 may have, for example, data information values 1, -1, i, or -i.

Each of the sets of pilot symbols may comprise a pair of adjacent pilot symbols. For example, the first set of pilot symbols may include a first pilot symbol 110-0 and an adjacent pilot symbol 110-1. The second set of pilot symbols may include a first pilot symbol 110-50 and an adjacent pilot symbol 110-51. Thus, the fifty symbol period (i.e. N=50) from symbol 110-1 thru 110-50 is defined by data symbols 110-2 . . . 110-49 disposed between a first pilot symbol 110-1 and a second pilot symbol 110-50. Of course, alternative numbers of pilot symbols and sequencing with corresponding data symbols may also be employed. Data symbol 110-2 is adjacent pilot symbol 110-1 and data symbol 110-49 is adjacent pilot symbol 110-50 to form a first and second set of pilot symbols, respectively. The resultant stream 100 is transmitted to a receiver 60 via optical cable 15. The above example of the insertion of two pilot symbols (110-1, 110-50) per fifty symbol period, increases the symbol rate of the transmitted signal by 4% which causes approximately a 0.17 dB optical signal to noise ratio (OSNR) penalty. However, insertion of the pilot symbols advantageously mitigates phase tracking errors and enables the use of coherent PSK without the need of symbol precoding, and overall system performance improves by approximately 1 dB at low OSNR.

The modulated optical signal 25 is received by receiver 60 where each of the data symbols (e.g. 110-2 . . . 110-49) and pilot symbols (110-0, 110-1, 110-50, 110-51) have an associated phase consistent with the modulation format such as, for example, QPSK supplied by transmitter 20. Receiver 60 detects the received pilot symbols and estimates the carrier phase of these pilot symbols using the following equation:

$$\Phi_n = \Phi_{n+1} = \Phi_{n-1} + \arg\left[\sum_{k=0}^{1} r_{n+k}\exp(-i\phi_{n-1})\right] \quad (1)$$

where Φn represents the carrier phase of a first pilot symbol, $\Phi_{n+1}$ represents the carrier phase of an adjacent pilot symbol, $\phi_{n-1}$ represents the carrier phase of a data symbol adjacent the first pilot symbol and $r_n$ represents the received data symbol. For example, Φn may represent the phase of pilot symbol 110-50, Φn+1 represents the carrier phase of pilot symbol 110-51 (i.e. n and n+1, respectively) and $\phi_{n-1}$ represents the carrier phase of data symbol 110-49 all of which are shown in FIG. 2.

The last term of Equation (1) represents the differential phase between the pilot symbol and the previous (immediately preceding) data symbol. In the above example, this corresponds to determining the differential phase between the carrier phase of pilot symbol 110-50 and the carrier phase of data symbol 110-49 since the data symbol 110-49 immediately precedes pilot symbol 110-50. This differential phase is compared to a defined phase tolerance and if the differential phase exceeds this tolerance, then this indicates that the phase tracking of the signal at receiver 60 was lost. This phase tolerance is relatively large such as, for example, greater than π/3 radians. In the above example, if the phase differential is greater than π/3 radians, then the phase tracking of the carrier phase between the pilot symbols 110-50 and 110-1 was lost.

Of course, the phase tolerance of π/3 radians is used herein as an example and other tolerances may be applicable based on the modulation scheme, length of transmission, etc.

Once the determination is made that the differential phase falls outside the phase tolerance and phase tracking has been lost between the pilot symbols, this loss of phase tracking may be corrected via linear interpolation since phase is assumed to trend linearly. The following Equation (2) is used for this linear interpolation-based correction and assumes that the period has a length of 50 symbols as described with reference to FIG. 2:

$$\phi_{n-j} = \phi_{n-j+1} + \frac{\Phi_{n-50} - \Phi_n}{49}, \quad j = 1, 2, \ldots 48 \quad (2)$$

where Φ(n) and Φ(n−50) are the estimated carrier phase of the pilot symbols 110-50 and 110-1 and again φ is the phase of an associated data symbol. Of course, the period length may be modified based on the particular application.

Figure 3:
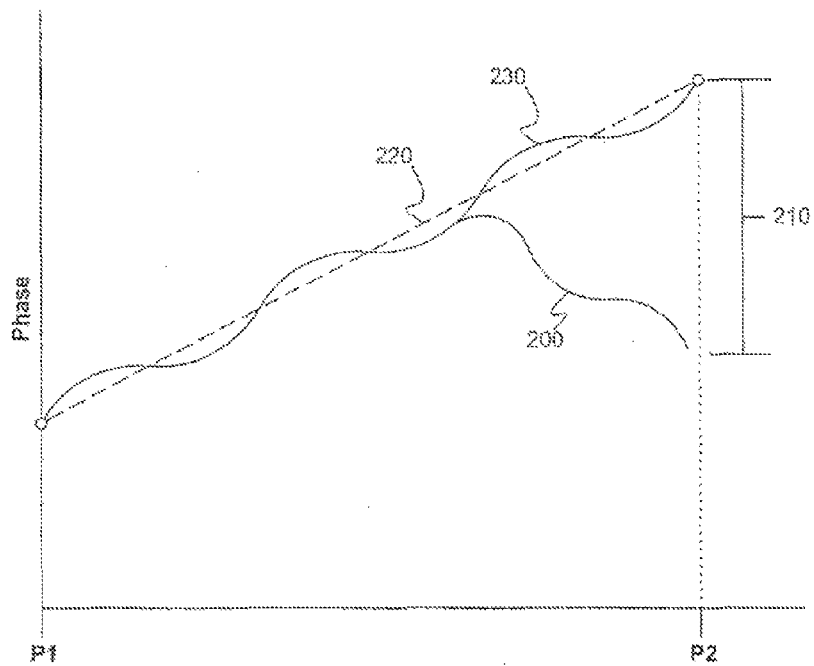
FIG. 3 is a depiction of correction of phase tracking in accordance with the present disclosure.

FIG. 3 is a notional depiction (not drawn to scale) of the phase tracking correction via linear interpolation utilizing Equation (2) above. The phase 200 is illustrated between a first pilot symbol corresponding, for example, to pilot symbol 110-1 at P1 and a second pilot symbol corresponding, for example, to pilot symbol 110-50 at P2. The differential phase (denoted graphically at 210) is determined between the pilot symbol at P2 and the phase of the data symbol preceding the pilot symbol at P2. If the differential phase is not greater than π/3 radians than phase tracking of the data symbols between the pilot symbols proceeds. Again, if the differential phase 210 is large enough, for example, greater than π/3 radians, then a correction is applied to the carrier phase of the data symbols based on linear interpolation as shown by dashed line 220, to yield a corrected phase track 230.

The carrier phase of the data symbols ($\phi_n$) between the pilot symbols (110-1 and 110-50) is estimated. This may be done using an $M^{th}$ power scheme with or without joint polarization carrier phase estimation. The equation for $M^{th}$ power scheme where M=4 (i.e. $4^{th}$ power) is as follows:

$$\phi_n = \phi_{n-1} + \frac{\mu}{4} \arg\left[\sum_{k=0}^{N} r_{n+k}^4 \exp(-i 4\phi_{n-1})\right] \quad (3)$$

where μ is a Kalman filter coefficient. It is important to note that the drawbacks associated with $M^{th}$ power scheme (i.e. phase estimation error) referenced above is associated with removing data modulation from the signal without the use of pilot symbols to estimate the carrier phase. The use of the $M^{th}$ power scheme of Equation (3) is with respect to the carrier phase of the data symbols between the pairs of pilot symbols.

Alternatively, the carrier phase of the data symbols between the pairs of pilot symbols may be estimated by using Mth power scheme with joint polarization carrier phase estimation as described in *ECOC '2008, paper No. 4, D.2*, M. Kuschnerov, et al., Brussels, September 2008, the contents of which are incorporated herein by reference. The phase of the X and Y polarization tributaries associated with the modulated data symbols is calculated separately using the following equations:

$$\phi_n(X) = \quad (4)$$
$$\phi_{n-1}(X) + \frac{\mu}{4}\arg\left[\sum_{k=0}^{N} r_{n+k}^4(X) e^{-i4\phi_{n-1}(X)} + C\sum_{k=0}^{N} r_{n+k}^4(Y) e^{-i4\phi_{n-1}(Y)}\right]$$

and $$\phi_n(Y) =$$
$$\phi_{n-1}(Y) + \frac{\mu}{4}\arg\left[\sum_{k=0}^{N} r_{n+k}^4(Y) e^{-i4\phi_{n-1}(Y)} + C\sum_{k=0}^{N} r_{n+k}^4(X) e^{-i4\phi_{n-1}(X)}\right]$$

where C is the coupling coefficient between X-polarization and Y-polarization tributaries. Joint polarization phase estimation improves the performance of carrier phase estimation by effectively increasing the averaging window size. The optimal coupling coefficient C∈ [0, 1] may vary depending on nonlinear XPM effect which leads to reduced correlation between the carrier phase of QPSK polarization tributaries. However, the use of pilot symbols significantly helps to tolerate a non-optimized C value. This is because the phase of the pilot symbols can be estimated with high accuracy, but without ambiguity. The value of the coupling coefficient can be selected by default (e.g., 0.7) and the accumulated phase error of data symbols due to non-optimal C values are corrected periodically with the pilot symbols. In this manner the carrier phase of the data symbols between the pilot symbols in a received symbol sequence may be estimated and coherent decoding using QPSK may be utilized to realize better system performance.

Figure 4:
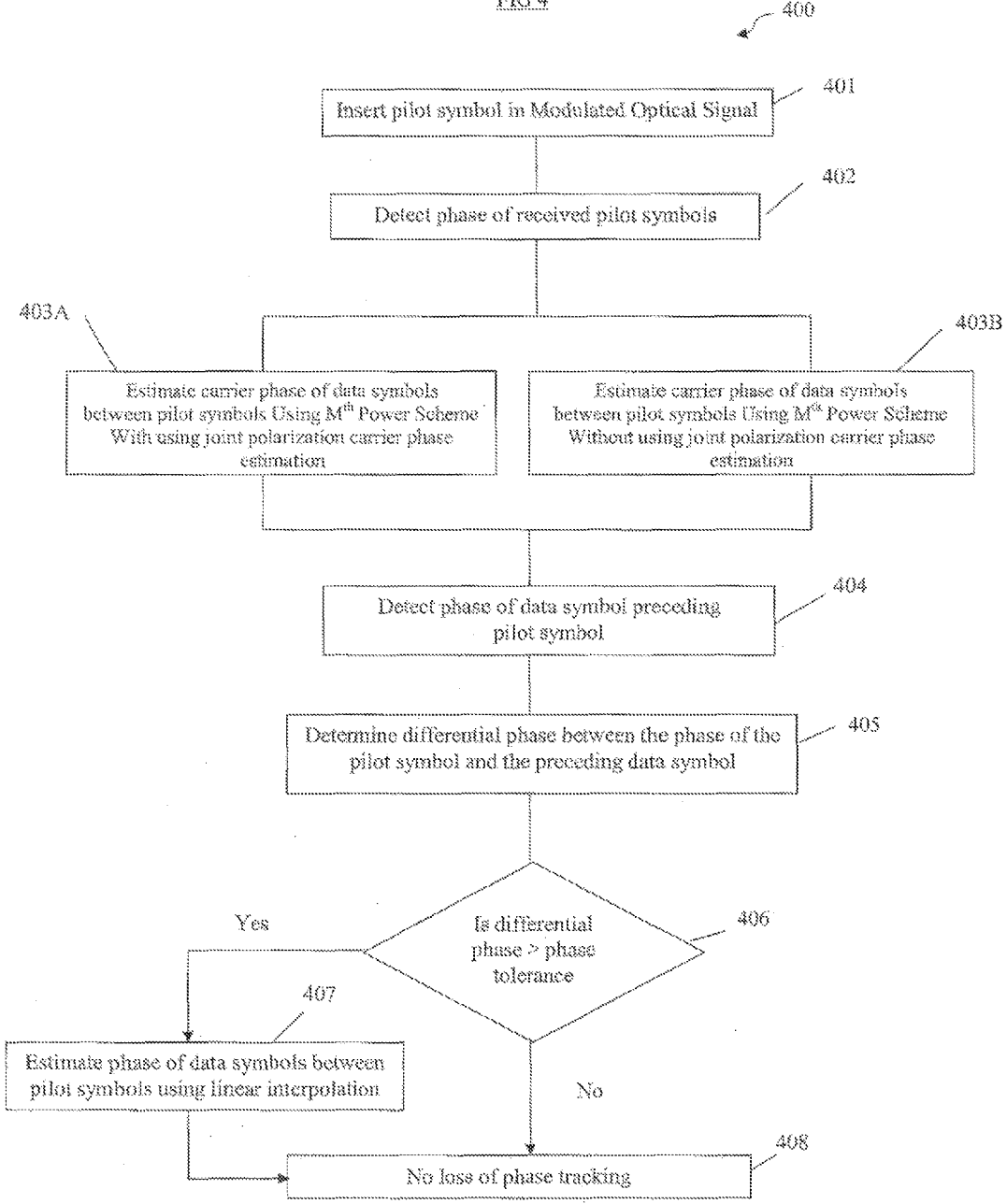
FIG. 4 is a flow diagram illustrating a process in accordance with the present disclosure.

FIG. 4 is a flow chart graphically illustrating the preceding method of pilot symbol aided carrier phase estimation 400. In particular, at step 401 pilot symbols having known data information are inserted periodically within a sequence of data symbols of a modulated optical signal at an optical transmitter. The data symbols and the pilot symbols each have an associated phase consistent with a predefined data modulation for optical signal transmission. The phase of each of the pilot symbols is detected at step 402 at a receiver. The carrier phase of the data symbols between the pilot symbols is estimated. This is done using $M^{th}$ power scheme with joint polarization carrier phase estimation at step 403. The phase of the data symbol (e.g. data symbol 110-49 of FIG. 2) immediately preceding or adjacent the pilot symbol (e.g. pilot symbol 110-50 of FIG. 2) is detected at step 404. The differential phase between the carrier phase of the pilot symbol and the carrier phase of the data symbol which immediately precedes the pilot symbol is determined at step 405. This differential phase is compared to a phase tolerance (e.g. π/3 radians) at step 406 to determine if cycle slip or phase error of the data symbols occurred before the pilot symbol (e.g. pilot symbol 110-50).

If the differential phase is not greater than the phase tolerance, the process proceeds to step 408 where no loss of phase tracking was detected and the data is decoded. If the differential phase is greater than the phase tolerance, then the process proceeds to step 407 where correction is applied to phase tracking of the data symbols between the pilot symbols using linear interpolation. The process proceeds to step 408 where there is no loss of phase tracking and the data may be decoded.

Figure 5:
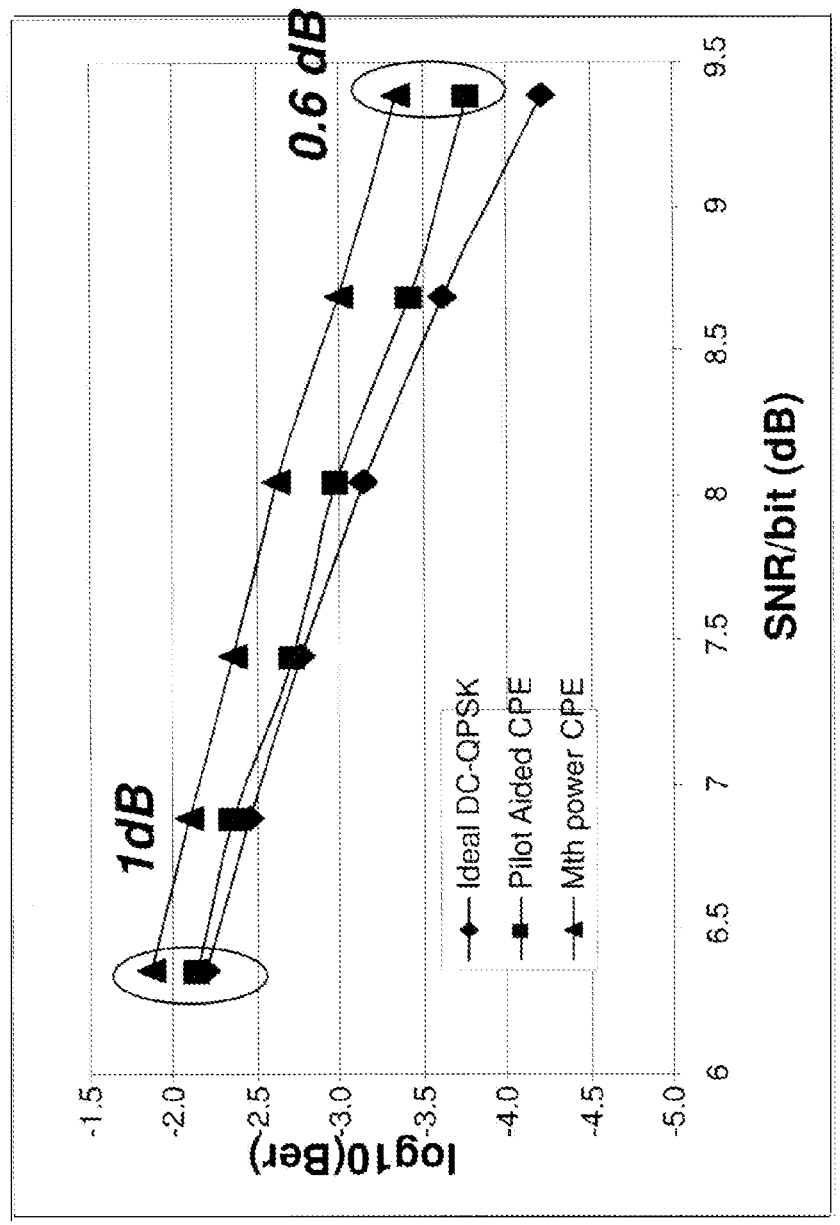
FIG. 5 is a graph showing performance of carrier phase estimation in accordance with the present disclosure.

The foregoing carrier phase estimation method was tested using orthogonally launched independent QPSK modulated signals with pilot symbols and decoded at a receiver. The receiver utilized carrier frequency estimation (CFE) method without the aid of pilot symbols and was compared to the carrier phase estimation (CPE) method with pilot symbols. In order to compare these two methods along with ideal performance, the bit error rate (BER) was plotted in FIG. 5. It is important to note that since the pilot symbols were added in the transmitted signal in accordance with the present disclosure, coherent QPSK could be used to decode the symbol information rather than using conventional $M^{th}$ power CPE which could only employ differential decoding (DC-QPSK) to decode the symbols. The decoding results illustrate a 1 dB Q-factor improvement at low SNR and 0.6 dB improvement at, high SNR. As is known to one of ordinary skill in the art, the term "Q-factor" suggests the minimum SNR required to obtain a specific BER for a given received signal.

Figure 6B:
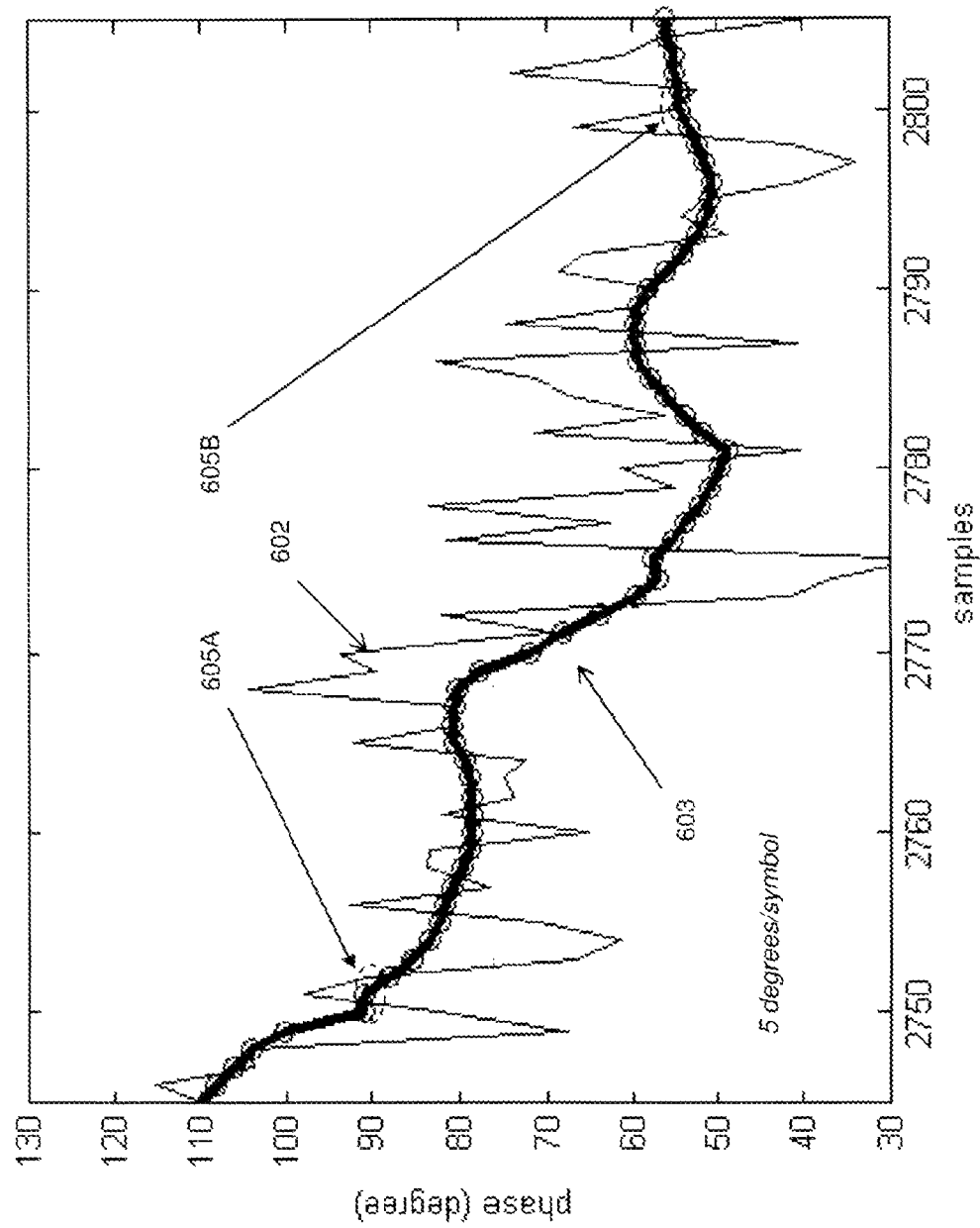

FIGS. 6A and 6B graph the phase tracking results without the use of pilot symbols and the phase tracking results using the pilot symbols respectively. In particular, FIG. 6A shows plot 600 of the estimated carrier phase assuming the data phase is known and plot 601 is the estimated carrier phase obtained by the conventional $4^{th}$ power estimation method (i.e., not using pilot symbol aided joint polarization estimation as in a presently disclosed embodiment). As can be seen from the divergence of plots 600 and 601, track loss was not corrected. In contrast, FIG. 6B shows plot 602 of the estimated carrier phase assuming the data phase is known and plot 603 of the estimated carrier phase obtained using pilot symbol aided joint polarization CPE together with coherent QPSK. The pilot symbol are indicated at points 605A and 605B with tracking of the data symbols therebetween. As indicated by plots 602 and 603, phase tracking is advantageously maintained, thereby enabling the use of coherent PSK for symbol decoding.

With pilot symbol aided joint polarization CPE, phase tracking is guaranteed because there is no phase ambiguity. Although loss of tracking may still occur between pilot symbols, such track loss is advantageously detected and corrected which is an improvement over the prior art.

Embodiments of the present disclosure may be implemented at a transmitter and receiver of an optical communication system. A processor may be used to effectuate operations associated with a communication system, as is known to one of ordinary skill in the art. A processor as used herein is a device for executing stored machine-readable instructions for performing tasks and may comprise any one or combination of hardware, software, and firmware. A processor may also comprise memory storing machine-readable instructions executable for performing tasks. A processor acts upon information by manipulating, analyzing, modifying, converting, or transmitting information for use by an executable procedure or an information device, and/or by routing the information to an output device. A processor may use or comprise the capabilities of, e.g., a controller or microprocessor. A processor may be electrically coupled with any other processor, enabling interaction and/or communication therebetween. A processor comprising executable instructions may be electrically coupled by being within stored executable instructions enabling interaction and/or communication with executable instructions comprising another processor. A user interface processor or generator is a known element comprising electronic circuitry or software, or a combination of both, for generating display images or portions thereof.

An executable application comprises code or machine readable instructions for conditioning the processor to implement predetermined functions, such as those of an operating system, a context data acquisition system, or other information processing system, e.g., in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A method, comprising:
   receiving an optical signal having a pilot symbol and multiple data symbols;
   detecting the carrier phase of at least one of said multiple data symbols adjacent said pilot symbol; and
   determining a differential phase between the phase of at least one of said multiple data symbols adjacent said pilot symbol and a phase of said pilot symbol; and
   estimating the carrier phase of the data symbols using linear interpolation when the differential phase exceeds a phase tolerance.

2. The method of claim 1 further comprising, before detecting the carrier phase of at least one of said multiple data symbols, estimating a carrier phase of the multiple data symbols.

3. The method of claim 2 wherein estimating the carrier phase of the data symbols further comprising estimating the carrier phase using an Mth power scheme with joint polarization carrier phase estimation.

4. The method of claim 1, wherein the phase tolerance is $\pi/3$ radians.

5. A method for processing a received optical modulated signal comprising:
   receiving an optical signal having data symbols and a first and second pilot symbol, said data symbols disposed between said first and second pilot symbols, each of said data symbols and the pilot symbols having an associated phase;
   detecting the phase of the received pilot symbols;
   determining a differential phase between the detected phase of the received pilot symbols and the phase of at least one of said data symbols adjacent the second pilot symbol;
   comparing the differential phase to a defined phase tolerance; and
   estimating the phase of the data symbols when the determined differential phase exceeds said defined phase tolerance, wherein estimating the phase of the data symbols when said determined differential phase exceeds said defined phase tolerance further comprises estimating the phase of the data symbols using linear interpolation.

6. The method of claim 5 wherein estimating the carrier phase of the data symbols before determining the differential phase further comprises applying an Mth power scheme to said data symbols.

7. The method of claim 6 further comprising estimating the phase of the data symbols utilizing joint polarization carrier phase estimation.

8. The method of claim 5 wherein the first pilot symbol is a first set of pilot symbols comprising at least two adjacent pilot symbols.

9. The method of claim 5 wherein the second pilot symbol is a second set of pilot symbols comprising at least two adjacent pilot symbols.

10. The method of claim 5, wherein said data symbols comprise 50 consecutive data symbols.

11. The method of claim 5, wherein the phase tolerance is $\pi/3$ radians.

12. The method of claim 5 further comprising, after detecting the phase of the received pilot symbols, estimating the phase of the data symbols.

13. An optical receiver comprising:
   a plurality of photodetectors each configured to generate an electrical signal proportional to a received optical signal, said optical signal having a plurality of channels each including a pilot symbol and data symbols;
   an analog to digital converter configured to convert each of said electrical signals to digital signals; and
   a digital signal processor (DSP) communicating with said analog to digital converter, said DSP comprising a carrier phase estimation module configured to:
   detect carrier phase of a data symbol that is adjacent said pilot symbol;
   determine a differential phase between one of said data symbols adjacent said pilot symbol and said pilot symbol; and
   estimate the phase of the data symbols using linear interpolation when said determined differential phase exceeds a defined phase tolerance.

14. The optical receiver of claim 13 further comprising:
   a local oscillator circuit; and
   a plurality of hybrid interferometers communicating with said local oscillator circuit, each of said hybrid interferometers configured to receive the plurality of optical signal channels and extract signals representing a phase and amplitude between the received optical channels and a signal received from said local oscillator and supply said phase and amplitude signals to a corresponding one of said plurality of photodetectors.

15. The optical receiver of claim 14 further comprising a polarization beam splitter configured to supply the plurality of optical signal channels to each of said plurality of hybrid interferometers.

* * * * *